United States Patent [19]
Mizoguchi

[11] Patent Number: 5,383,224
[45] Date of Patent: Jan. 17, 1995

[54] CROSS POLARIZATION INTERFERENCE CANCELLER

[75] Inventor: Shoichi Mizoguchi, Tokyo, Japan
[73] Assignee: NEC Corporation, Japan
[21] Appl. No.: 980,662
[22] Filed: Nov. 24, 1992
[30] Foreign Application Priority Data
Nov. 27, 1991 [JP] Japan .................. 3-312760
[51] Int. Cl.$^6$ .................. H03D 1/04; H04B 1/10
[52] U.S. Cl. .................. 375/99; 375/102; 375/11; 370/6; 455/295; 455/296
[58] Field of Search .................. 455/60, 63, 295, 296, 455/305; 375/11, 14, 99, 102, 39; 333/21 A; 370/6

[56] References Cited
U.S. PATENT DOCUMENTS

| | | | |
|---|---|---|---|
| 4,688,235 | 8/1987 | Tahara et al. | 375/102 |
| 4,910,468 | 3/1990 | Ohtsuka et al. | 455/295 |
| 4,914,676 | 4/1990 | Iwamatsu et al. | 375/102 |

FOREIGN PATENT DOCUMENTS

| | | | |
|---|---|---|---|
| 0358648 | 3/1989 | Japan . | |
| 0421226 | 1/1992 | Japan . | |

*Primary Examiner*—Stephen Chin
*Assistant Examiner*—Don Vo
*Attorney, Agent, or Firm*—Ostrolenk, Faber, Gerb & Soffen

[57] ABSTRACT

In a cross polarization interference canceller for use in digital radio communications, a signal processing circuit monitors whether numbers of word sync signals and error pulses obtained in error correction decoding exceed specified values, and outputs reset signal RS1 when an abnormality is detected. A signal level detection circuit outputs reset signal RS2 when it is detected that a level of a different polarization side baseband signal from a demodulator is lower than specified. A logical sum RS3 of reset signals RS1 and RS2 is supplied to a cross polarization interference cancellation device, which may have a transversal filter. When the word is not synchronized or the number of error pulses generated in error correcting decoding exceeds the specified value, the self-polarization side can be protected from unnecessary interference and disturbance and the self-polarization side data can be protected from disturbance even though an abrupt abnormality occurs in different polarization signals.

18 Claims, 3 Drawing Sheets

CROSS POLARIZATION INTERFERENCE CANCELLER

BACKGROUND OF THE INVENTION

The present invention relates to a cross polarization interference canceller to be advantageously applied to digital radio communications, more particularly to a cross polarization interference canceller, which employs a base band full digital transversal filter as a cross polarization interference cancellation means, for use in digital radio communications based on a multi-level quadrature amplitude modulation system and a multiphase modulation system.

DESCRIPTION OF THE RELATED ART

Lately, in digital radio communication systems, a cross polarized wave transmission system has been used for effective utilization of frequencies. The cross polarized wave transmission system transmits two independent signals having the same frequency by using two orthogonal polarized waves, that is, horizontal polarized wave and vertical polarized wave.

In application of this transmission system to the multi-level quadrature amplitude modulation or the multiphase modulation system, a cross polarization interference takes place due to fading of the transmission path and deterioration of aerial cross polarization discrimination. Therefore the reception side employs a cross polarization interference canceller to prevent such cross polarization interference.

This cross polarization interference canceller is intended to carry out resetting to protect the main polarization side from undesired interference and trouble when an abnormality of different polarization signal occurs. However, a conventional cross polarization interference canceller has required a huge lot of processing time if an error correction system for signals with a large word length or a Viterbi decoding system was used, that is, signal strings were rearranged by a so-called interleaving method. Consequently, a longer time has been required to output a reset signal generated after processing of signals and a leakage and an error might have occurred at the main polarization side due to a delay of resetting operation.

SUMMARY OF THE INVENTION

An object of the present invention is to provide a cross polarization interference canceller capable of eliminating the above described disadvantages of the prior art and preventing a disturbance from occurring at the main polarization side even if an abnormality abruptly occurs in the different polarized signal.

In accordance with the present invention, there is provided a cross polarization interference canceller comprising first analog/digital conversion means and second analog/digital conversion means for converting different polarization side baseband signals from a different polarization side demodulator to digital signals, cross polarization interference cancellation means for receiving output signals from the first analog/digital conversion means and generating reverse characteristic signals which are cross polarization interference components from different polarization signals to main polarization signals which are produced in propagation paths by an adaptive control, signal processing means for receiving output signals from the second analog/digital conversion means, outputting different polarization side data after differential decoding and error correction decoding of these output signals and transmitting a first reset signal to the cross polarization interference canceller when an abnormality is detected, signal level detection means for receiving different polarization side baseband signals from the different polarization side demodulator and transmitting a second reset signal when the levels of these signals are lower than a predetermined level, and resetting means for receiving the first and second reset signals and outputting a third reset signal to reset the cross polarization interference cancellation means when either one of these first and second reset signals is received.

Furthermore, in accordance with the present invention, there is provided a cross polarization interference canceller comprising first analog/digital conversion means for converting main polarization side base band from a main polarization side demodulator to digital signals and outputting main polarization side digital signals, second and third analog/digital conversion means for converting different polarization side base band signals from a different polarization side demodulator to digital signals, cross polarization interference cancellation means for receiving output signals from the second analog/digital conversion means and generating reverse characteristic signals which are cross polarization interference components from different polarization signals to main polarization signals which are produced in propagation paths by an adaptive control, adding means for receiving main polarization side digital signals from the first analog/digital conversion means and reverse characteristic signals of the cross polarization interference components from the cross polarization interference cancellation means and outputting compensated signals which eliminated the cross polarization interference components by adding those digital signals, first signal processing means for receiving the compensated signals from the adding means, executing a decoding corresponding to coding executed at a transmission side and outputting main polarization side data, second signal processing means for receiving output signals from the third analog/digital conversion means, outputting different polarization side data after differential decoding and error correction decoding of these output signals and transmitting a first reset signal to the cross polarization interference cancellation means when an abnormality is detected, signal level detection means for receiving different polarization side baseband signals from the different polarization side demodulator and transmitting a second reset signal when levels of these signals are lower than a predetermined value, and resetting means for receiving the first reset signal and the second reset signal and outputting a third reset signal for resetting the cross polarization interference cancellation means when either one of these reset signals is received.

BRIEF DESCRIPTION OF THE DRAWINGS

The objects and features of the present invention will become more apparent from the consideration of the following detailed description of the preferred embodiments of the invention with reference to the accompanying drawings, in which.

DESCRIPTION OF THE PREFERRED EMBODIMENTS

Preferred embodiments of a cross polarization interference canceller in accordance with the present invention will be described below in detail, referring to the accompanying drawings.

Figure 1:
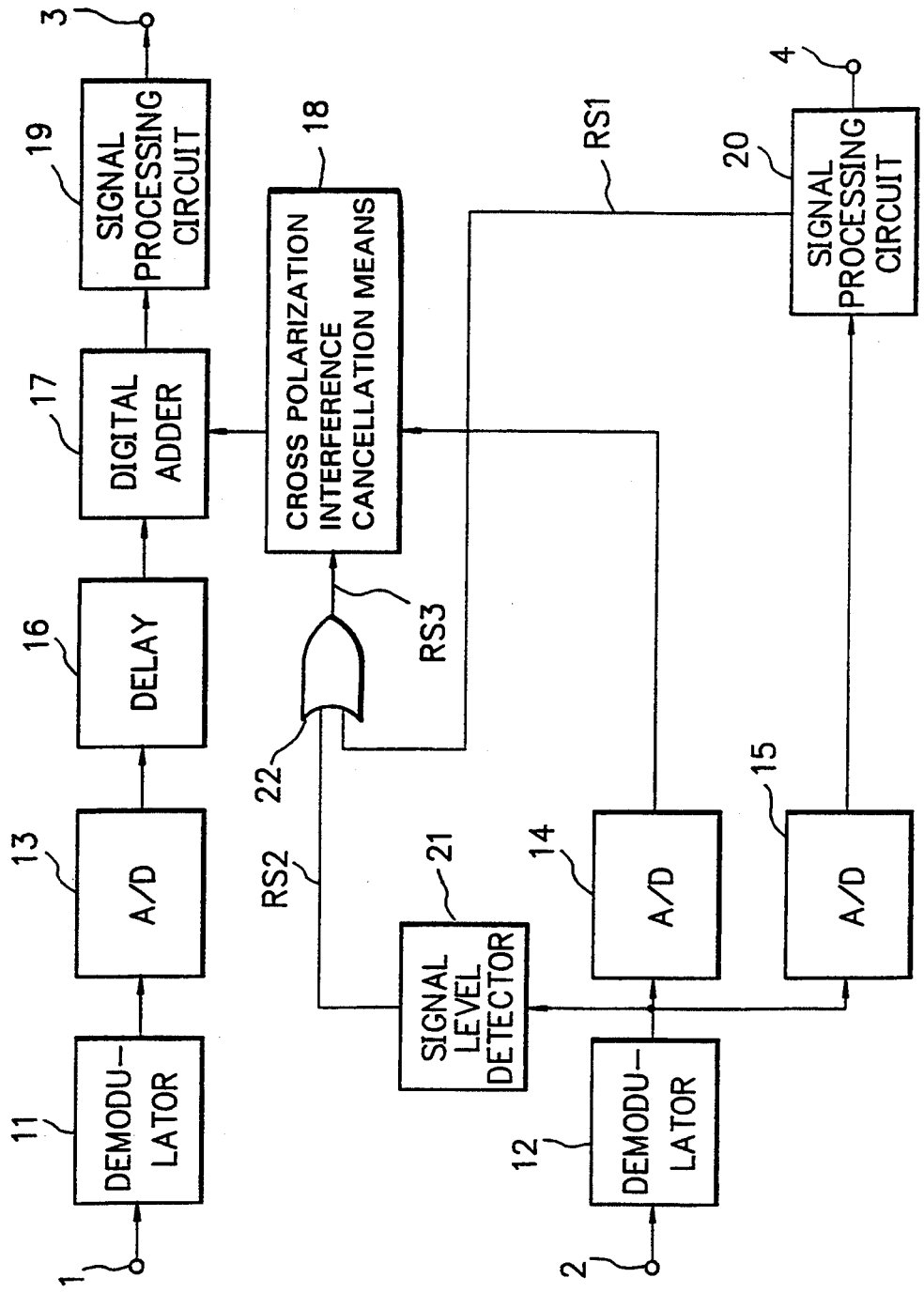
FIG. 1 is a block diagram illustrating an embodiment of a cross polarization interference canceller in accordance with the present invention.

FIG. 1 is a functional block diagram illustrating an embodiment of a cross polarization interference canceller according to the present invention. The cross polarization interference canceller in this embodiment applies to digital radio communications based on a multilevel quadrature amplitude modulation system or a multiphase modulation system and employs a full digital type transversal filter in a cross polarization interference cancellation means. For the purpose of describing the cross polarization interference canceller in this embodiment, cross polarized waves are referred to as "main polarization signals" and those signals, which may be a source of interference, as different polarization signals. The cross polarization interference canceller receives the main polarization signals, which are intermediate frequency band (hereafter referred to as "IF band") modulated waves, through an input terminal 1 and receives IF band different polarization signals through an input terminal 2.

The input terminal 1 is connected to a demodulator 11 and the signals entered therefrom are transmitted to the demodulator 11. The demodulator 11 is a circuit which detects IF band main polarization signals and demodulates these signals as the main polarization side base band signals. The demodulator 11 is connected to an analog/digital converter 13 and transmits the main polarization side baseband signals to the converter 13.

The analog/digital converter 13 samples and quantizes the main polarization side baseband signals entered and converts these signals to a main polarization side digital signal string. The analog/digital converter 13 is connected to a delay circuit 16 and outputs the converted main polarization side digital signal string to this delay circuit 16.

The delay circuit 16 delays the main polarization side digital signal string entered for a specified time. The delay circuit 16 is connected to a digital adder 17 and transmits the main polarization side digital signal string to the adder 17 after an appropriate time delay in order to compensate the delay time caused by the cross polarization interference cancellation means 18.

On the other hand, the input terminal 2 is connected to the demodulator 12 and the signals entered through this input terminal 2 are transmitted to the demodulator 12. The demodulator 12 is a circuit for detecting IF band different polarization signals and demodulates these signals as the different polarization side baseband signals. The demodulator 12 is connected to the analog/digital converters 14 and 15 and the signal level detection circuit 21 and outputs different polarization side baseband signals.

Analog/digital converters 14 and 15 sample and quantize the different polarization side baseband signals entered and convert these signals to different polarization side digital signal strings. The analog/digital converter 14 is connected to the cross polarization interference cancellation means 18 and the analog/digital converter 15 is connected to the signal processing circuit 20, respectively, and transmit the converted different polarization side digital signal strings thereto.

Figure 3:
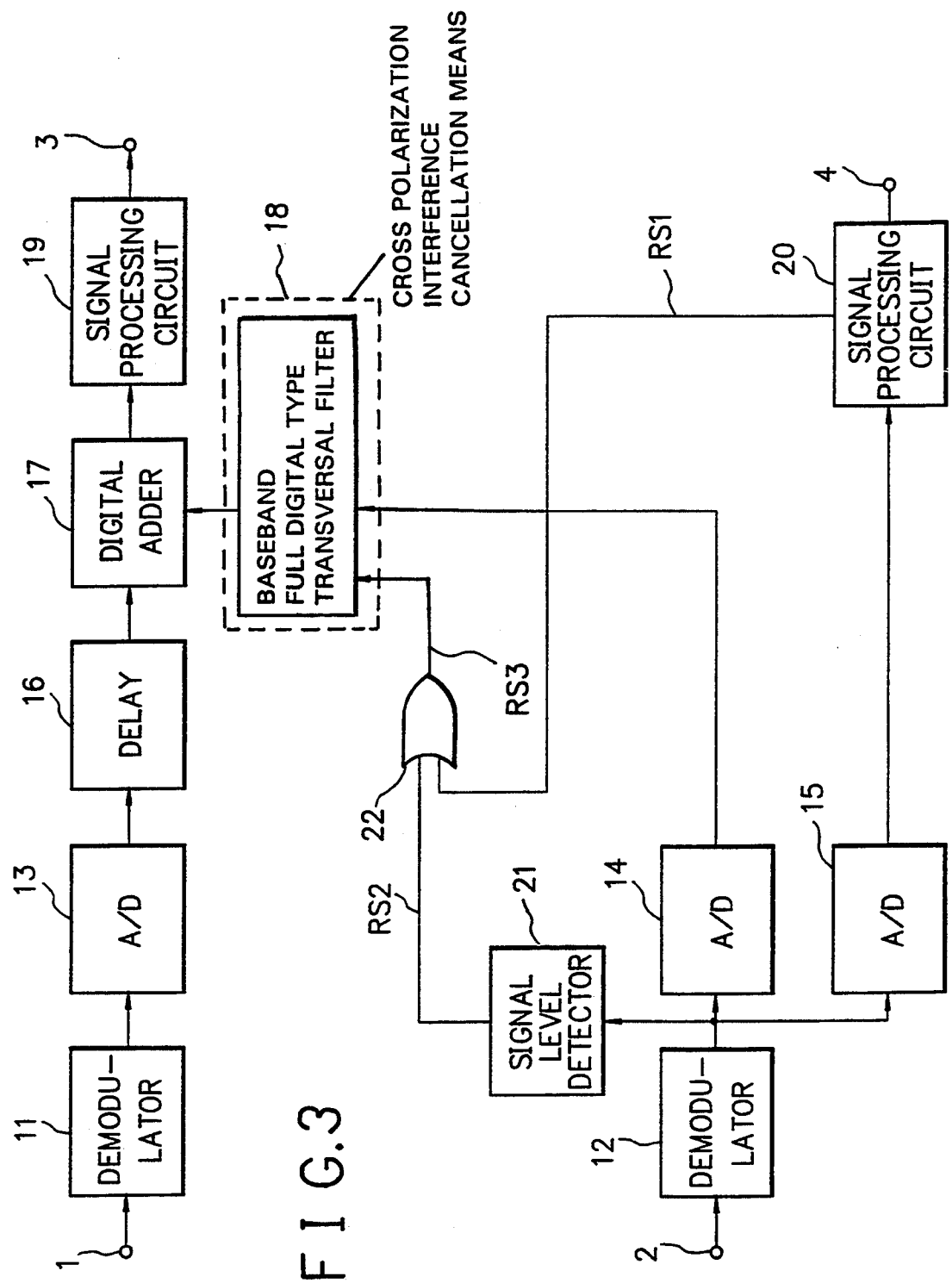
FIG. 3 is a block diagram corresponding to FIG. 1 and showing the cross polarization interference cancellation means in more detail.

The cross polarization interference cancellation means 18 is a circuit for generating a reverse characteristic signal of a cross polarization interference component from different polarization signals to main polarization signals produced by the adaptive control in a propagation path from the different polarization side digital signal strings entered. In other words, the cross polarization interference cancellation means 18 produces the reverse characteristic component of the interference component (baseband) of the different polarization signal included in the main polarization signal by adaptive control of tap coefficients of the internal transversal filter which is comprised in the cross polarization interference cancellation means 18 in the preferred embodiment of the invention, as seen in the block diagram in FIG. 3. The cross polarization interference cancellation means 18 is connected to the digital adder 17 and outputs the generated reverse characteristic signals.

The signal processing circuit 20 carries out differential decoding and error correction decoding of different polarization side digital signal strings received from the analog/digital converter 15 and outputs signal-processed different polarization side data to the output terminal 4. The signal processing circuit monitors the numbers of generated word sync signals and error pulses which are obtained in error correction decoding and outputs the reset signal RS1 to the OR circuit 22 when an abnormality is detected.

The signal level detection circuit 21 detects the level of the different polarization side baseband signal from the different polarization side demodulator 12. The signal level detection circuit 21 is connected to the OR circuit 22 and outputs the reset signal RS2 to this OR circuit 22 when the level of the different polarization side baseband signal is smaller than specified.

Figure 2:
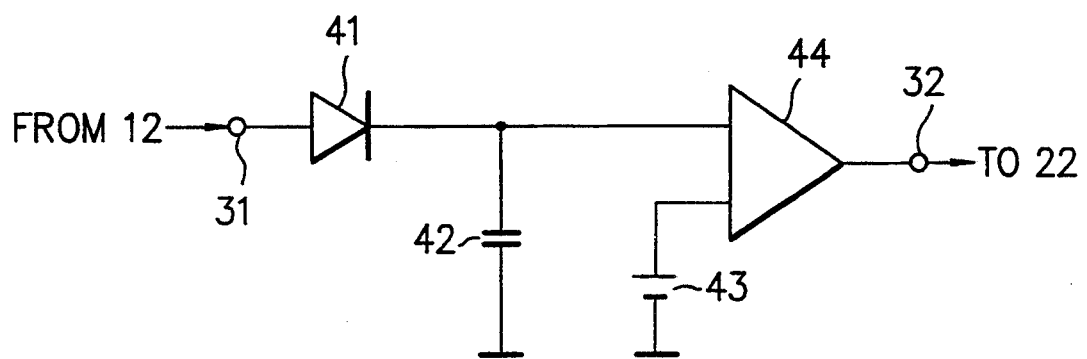
FIG. 2 is a circuit diagram illustrating an example of circuit configuration of a signal level detection circuit shown in FIG. 1.

FIG. 2 shows an example of circuit configuration of the signal level detection circuit 21. As shown in FIG. 2, the signal level detection circuit 21 comprises diode 41, capacitor 42, reference voltage 43 and voltage comparator 44. The diode 41 is a rectifier for rectifying different polarization side baseband signals entered from the demodulator 12 through the input terminal 31. Rectified different polarization side baseband signals are smoothed by one capacitor 42 of which a terminal is grounded and the signals are then supplied into an input terminal of the voltage comparator 44. The voltage comparator 44 is a circuit for comparing the reference voltage 43 by which the other input terminal is biased to a specified potential and the voltage of the detection signal which is smoothed by this reference voltage 43 and the capacitor 42. The voltage comparator 44 outputs the reset signal RS2 of logic "1" to the OR circuit 22 through the output terminal 32 if the output level of a detected signal is lower than the reference voltage 43. In addition, the voltage comparator 44 outputs a logic 0 signal to the OR circuit 22 through the output terminal 32 if the output level of a detected signal is higher than the reference voltage 43.

Now returning to FIG. 1, the OR circuit 22 takes a logical sum of the reset signal RS1 and the reset signal RS2 and outputs the logical sum as the reset signal RS3 to the cross polarization interference cancellation means 18. The cross polarization interference cancellation means 18 fixes all the tap coefficients of the transversal filter to "0" and sets the output to the digital adder 17 to "0" when the reset signal RS3 is entered.

Thus, in this embodiment, the self polarization side is protected from being affected by an unnecessary interference through the cross polarization interference cancellation means 18 even when the different polarization signal is abnormal. The cross polarization interference cancellation means is disclosed in, for example, the Japanese Patent Application Nos. 195515/1989 and 126161/1990.

Operation of the cross polarization interference canceller with the above described configuration is as described below.

In FIG. 1, the terminal 1 enters an IF band main polarization signal. The demodulator 11 detects the IF band main polarization signal entered through the terminal 1 and outputs it as the main polarization side baseband signal to the analog/digital converter 13. The analog/digital converter 13 outputs this main polarization side baseband signal as the main polarization side digital string to the delay circuit 16 after having sampled and quantized it.

On the other hand, the terminal 2 enters an IF band different polarization signal. The demodulator 12 detects the IF band different polarization signal from the terminal 2 and outputs it as the different polarization side baseband signal to analog/digital converters 14 and 15. Analog/digital converters 14 and 15 sample and quantize the different polarization side baseband signal and output it to the full digital type cross polarization interference cancellation means 18 and the signal processing circuit 20, respectively.

The cross polarization interference cancellation means 18 generates the reverse characteristic component of the interference component (baseband) of the different polarization signal included in the main polarization signal through adaptive control of the tap coefficient of the internal transversal filter and outputs it to the digital adder 17.

The delay circuit 16 delays the main polarization side digital signal string to compensate the delay time caused by the cross polarization interference cancellation means 18 and outputs it to the digital adder 17. The digital adder 17 adds the main polarization side digital signal string and the output digital signal string of the cross polarization interference cancellation means 18, eliminates the cross polarization interference component to the main polarization signal from the different polarization signal and outputs as a compensated signal to the signal processing circuit 19.

As described above, the signal processing circuit 19 outputs the processed signals as the main polarization side data to the terminal 3 after such processings as differential decoding and error correction decoding of signals. The signal processing circuit 20, as in case of the main polarization signal, outputs processed signals as the different polarization side data to the terminal 4 after differential decoding and error correction decoding of the output signals of the analog/digital converter 15. The signal processing circuit 20, as described in related art, monitors the status of different polarization signal with the word sync signal and the error pulse signal obtained in error correction decoding and determines that the input of the analog/digital converters 14 and 15 is abnormal when the word is not synchronized or the number of error pulses generated in error correcting decoding exceeds the specified value, and outputs the reset signal RS1.

The signal level detection circuit 21 determines the level of the different polarization side base band signal and outputs the reset signal RS2, assuming that IF band different polarization signal input is off when the above described number of error pulses is lower than specified. The OR circuit 22 enters the reset signals RS1 and RS2 and outputs the reset signal RS3 to the cross polarization interference cancellation means 18 when one of reset signals RS1 and RS2 is kept reset. The cross polarization interference cancellation means 18 fixes the tap coefficient of the transversal filter to "0" according to the reset signal RS3 and outputs "0".

From the above, it is known that, if the error ratio gradually deteriorates and the number of error pulses exceeds the specified value even though the different polarization side baseband signal level is higher than specified value due to the waveform distortion resulting from thermal noise and fading of the propagation paths, the signal processing circuit 20 outputs the reset signal RS1 to reset the cross polarization interference cancellation means 18. When IF different polarization signals being entered are suddenly off due to a failure of microwave band receiver, the signal level detection circuit 21 is able to output the reset signal RS2 before the reset signal RS1 and reset the cross polarization interference cancellation means 18 without delay. Therefore, the main polarization side data output can be prevented from failure since the tap coefficient of the transversal filter can be set to "0" before an abnormal signal leaks to the main polarization side through the cross polarization interference cancellation means 18 even when the processing time is extremely long due to complexity of the signal processing circuit 20 and an abrupt abnormality such as interruption of IF band different polarization signal takes place.

The signal level detection circuit 21 has a configuration as shown in FIG. 2. In FIG. 2, the different polarization side baseband signals entered into the terminal 31 are rectified by the diode 41, then smoothed by the capacitor 42 and entered into the voltage comparator 44. The voltage comparator 44 compares the output voltage of capacitor 42 and the reference voltage 43 and outputs "1" to the terminal 32 if the output voltage is lower than the reference voltage 42 and "0" to the terminal 32 if it is higher than the reference voltage.

As described above, the present invention provides an excellent effect to prevent the main polarization side data from being affected by disturbance even when an abnormality abruptly occurs in the different polarization signals.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A cross polarization interference canceller comprising:

first analog/digital conversion means and second analog/digital conversion means for converting different polarization side baseband signals supplied from a different polarization side demodulator which receives different polarization side modulated signals which cause a cross polarization interference to main polarization side modulated signals in propagation paths, to digital signals;

cross polarization interference cancellation means for receiving output signals from said first analog/digital conversion means and generating reverse characteristic signals of cross polarization interference components from different polarization signals to main polarization signals which are produced in propagation paths by an adaptive control, and for supplying said reverse characteristic signals to a digital adder of which another input is inputted to main polarization side digital baseband signals;

signal processing means for receiving output signals from said second analog/digital conversion means, and outputting different polarization side data after differential decoding and error correction decoding of said output signals received from said second analog/digital conversion means and transmitting a first reset signal to said cross polarization interference cancellation means when an abnormality is detected;

signal level detection means for receiving different polarization side baseband signals from the different polarization side demodulator and transmitting a second reset signal when levels of said received different polarization side baseband signals are lower than a predetermined value; and resetting means for receiving the first reset signals and the second reset signals and outputting a third reset signal to reset said cross polarization interference cancellation means when either one of said first and second reset signals is received.

2. A cross polarization interference canceller as claimed in claim 1, wherein said cross polarization interference cancellation means is operable in digital radio communications based on a multi-level quadrature amplitude modulation system.

3. A cross polarization interference canceller as claimed in claim 1, wherein said cross polarization interference cancellation means is operable in digital radio communications based on a multiphase modulation system.

4. A cross polarization interference canceller as claimed in claim 1, wherein said cross polarization interference cancellation means comprises a base band full digital type transversal filter.

5. A cross polarization interference canceller as claimed in claim 4, wherein said cross polarization interference cancellation means fixes a tap coefficient of a transversal filter to "0"and sets an output to "0"when said cross polarization interference cancellation means is reset by said resetting means.

6. A cross polarization interference canceller as claimed in claim 1, wherein said resetting means is an OR circuit.

7. A cross polarization interference canceller as claimed in claim 1, said signal level detection means including:

a rectifier for rectifying said different polarization side baseband signals;

a smoothing circuit for smoothing the output signal of said rectifier; and a voltage comparator for comparing the output level of said smoothing circuit with a reference voltage, and for outputting said second reset signal to said resetting means if said output level of said smoothing circuit is lower than said reference voltage.

8. A cross polarization interference canceller as claimed in claim 7, wherein said rectifier is a diode.

9. A cross polarization interference canceller as claimed in claim 7, wherein said smoothing circuit is a capacitor.

10. A cross polarization interference canceller comprising:

first analog/digital conversion means for converting main polarization side baseband signals from a main polarization side demodulator, which receives a main polarization side intermediate frequency modulated wave, to digital signals and outputting main polarization side digital signals;

second and third analog/digital conversion means for converting different polarization side baseband signals supplied from a different polarization side demodulator which receives different polarization side modulated signals which cause a cross polarization interference to main polarization side modulated signals in propagation paths, to digital signals;

cross polarization interference cancellation means for receiving output signals from said second analog/digital conversion means and generating reverse characteristic signals of cross polarization interference components from different polarization signals to main polarization signals which are produced in propagation paths by an adaptive control;

adding means for receiving said main polarization side digital signals from said first analog/digital conversion means through a delay means compensating for said cross polarization interference cancellation means, and said reverse characteristic signals of the cross polarization interference components supplied from said cross polarization interference cancellation means, and for outputting compensated signals from which the cross polarization interference components are eliminated by adding said main polarization side digital signals and said reverse characteristic signals;

first signal processing means for receiving the compensated signals from said adding means and outputting main polarization data after differential decoding and error correction decoding of said compensated signals from said adding means;

second signal processing means for receiving output signals from said third analog/digital conversion means, and outputting different polarization side data after differential decoding and error correction decoding of said output signals received from said third analog/digital conversion means, and transmitting a first reset signal to said cross polarization interference cancellation means when an abnormality is detected;

signal level detection means for receiving different polarization side baseband signals from said different polarization side demodulator and transmitting a second reset signal when levels of said receiving different polarization side baseband signals are lower than a predetermined value; and resetting means for receiving the first reset signal and the second reset signal and outputting a third reset signal for resetting said cross polarization interference cancellation means when either one of these reset signals is received.

11. A cross polarization interference canceller as claimed in claim 10, wherein said cross polarization interference cancellation means is operable in digital radio communications based on a multi-level quadrature amplitude modulation system.

12. A cross polarization interference canceller as claimed in claim 10, wherein said cross polarization interference cancellation means is operable in digital radio communications based on a multiphase modulation system.

13. A cross polarization interference canceller as claimed in claim 10, wherein said cross polarization interference cancellation means comprises a baseband full digital type transversal filter.

14. A cross polarization interference canceller as claimed in claim 13, wherein said cross polarization interference cancellation means fixes a tap coefficient of a transversal filter to "0" and sets an output to "0" when said cross polarization interference cancellation means is reset by said resetting means.

15. A cross polarization interference canceller as claimed in claim 10, wherein said resetting means is an OR circuit.

16. A cross polarization interference canceller as claimed in claim 10, said signal level detection means including:
- a rectifier for rectifying said different polarization side baseband signals;
- a smoothing circuit for smoothing the output signal of said rectifier; and
- a voltage comparator for comparing the output level of said smoothing circuit with a reference voltage, and for outputting said second reset signal to said resetting means if said output level of said smoothing circuit is lower than said reference voltage.

17. A cross polarization interference canceller as claimed in claim 16, wherein said rectifier is a diode.

18. A cross polarization interference canceller as claimed in claim 16, wherein said smoothing circuit is a capacitor.

* * * * *